Figure 3:
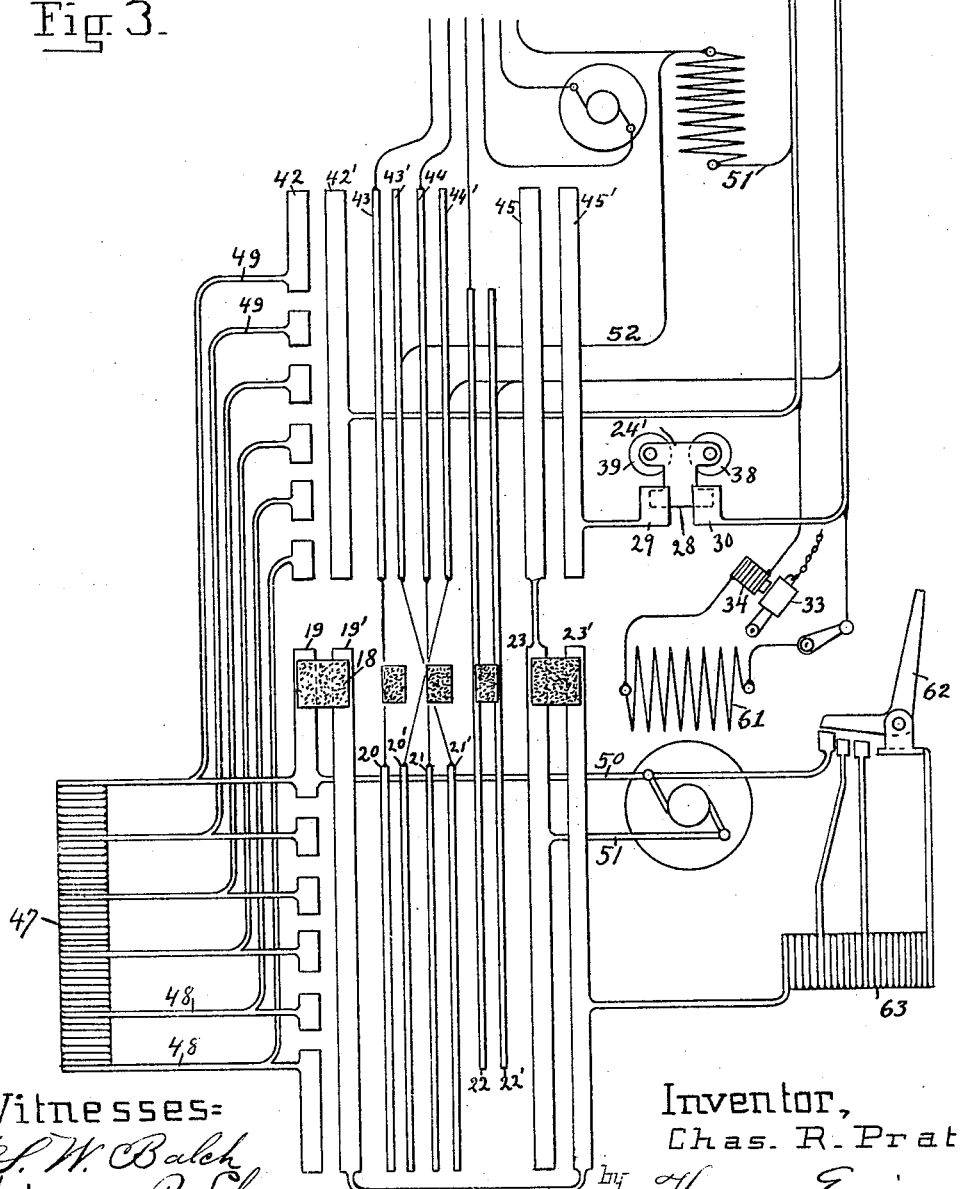

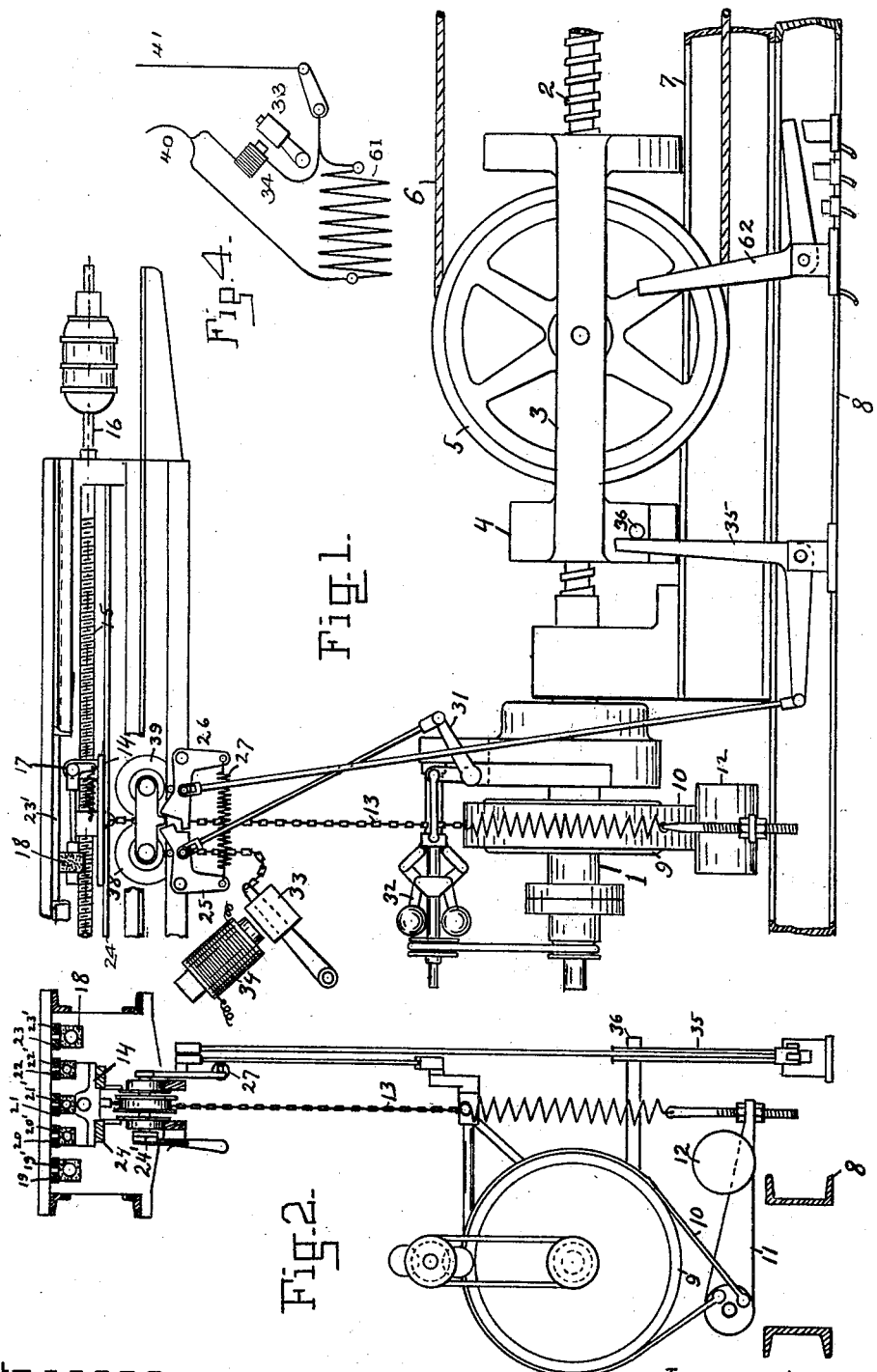

(No Model.) 3 Sheets—Sheet 2.

C. R. PRATT.
ELECTRIC ELEVATOR.

No. 509,397. Patented Nov. 28, 1893.

Witnesses:
C. W. Balch
Willard P. Shaw

Inventor,
Chas. R. Pratt,
by Thomas Ewing, Jr.
Attorney.

(No Model.)    3 Sheets—Sheet 3.
C. R. PRATT.
ELECTRIC ELEVATOR.
No. 509,397.    Patented Nov. 28, 1893.
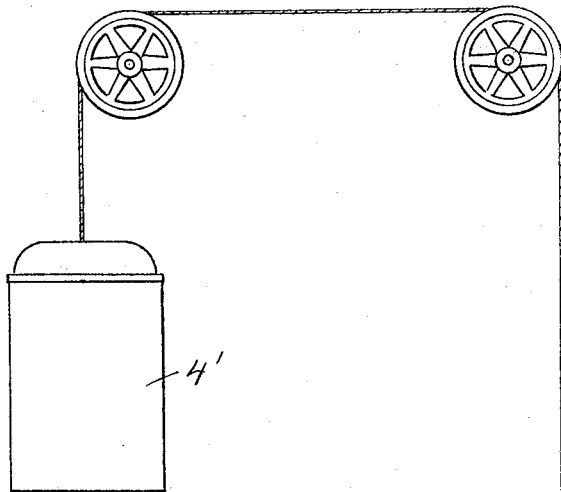
Fig. 5.
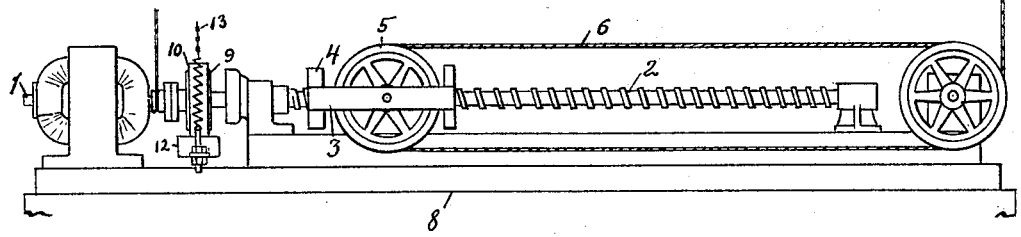
Witnesses:    Inventor,
C. W. Balch    Chas R. Pratt,
Willard P. Shaw    by Thomas Ewing Jr
          Attorney

UNITED STATES PATENT OFFICE.

CHARLES R. PRATT, OF NEW YORK, N. Y.

ELECTRIC ELEVATOR.

SPECIFICATION forming part of Letters Patent No. 509,397, dated November 28, 1893.

Application filed February 5, 1892. Serial No. 420,401. (No model.)

*To all whom it may concern:*

Be it known that I, CHARLES R. PRATT, a citizen of the United States of America, residing in the city, county, and State of New York, have invented certain new and useful Improvements in Electric Elevators, of which the following is a specification.

My invention is an improvement in electric elevators, and consists essentially in a system in which, while the car is descending, the armature of the driving motor can be disconnected from the feed circuit and be short circuited and the field magnets remain in the feed circuit, so that the motor shall act as a steady brake on the descending car; and it further consists in an electro magnetic device for operating a brake in case the current fails; and it further consists in certain other features hereinafter described and claimed.

Systems in which a motor is driven by and acts as a brake on the descending car, are, if the field magnets of the motor are excited by the current thus developed, defective in this particular, that when the car first starts there is no current flowing and no field, and the motor must be run long enough to build up its field before a sufficient current is developed to check the car. When the current has thus been developed the car will be checked, the intensity of the field will diminish and with it will diminish the current developed and the consequent braking effect of the motor; the car will then again increase its speed, to be again checked when the strength of the field has been again established. In a word the descent of the car will be irregular. To obviate this difficulty I use a driving motor having a separately excited field. The current developed will then depend at every moment of the descent on the rate of rotation of the armature and the resistance in the armature circuit and the braking effect will increase as the speed increases, or as this resistance is decreased, with the result that if the braking effect is sufficient for the load the car will attain and maintain uniformly a proper speed of descent. In this and in other points of construction hereinafter described the invention described in this application differs from that of my Patent No. 472,909, dated April 12, 1892, for an improvement in electric elevators.

In the accompanying drawings, Figure 1 is a portion of the hoisting mechanism of a nut and screw elevator and controlling apparatus therefor. Fig. 2 is a view, partly in section and partly in elevation of the same apparatus looking from the left. Fig. 3 is a diagram showing the circuit and connections of the apparatus. Fig. 4 shows a modification of the circuit. Fig. 5 shows the motor, car, and hoisting mechanism.

In Fig. 1 the shaft 1 of the electric driving motor is shown connected by any suitable means with the screw 2 by means of which the frame 3 having a cross head 4 and carrying suitable sheaves, is moved by a nut (not shown) toward the right or toward the left to operate the car 4'. The sheave 5 supports lifting cable 6 which is connected to the car.

The frame carrying the sheaves slides along a beam or track 7 rested on foundation beams 8.

On the motor or screw shaft is a pulley 9 which is connected with a shaft-brake 10, the two ends of which are connected with a pivoted lever 11, on the other end of which is attached a weight 12 on a chain 13 which is connected at its upper end to a carriage or movable switch member 14. This carriage engages with a screw shaft 15 connected with the armature shaft 16 of a second motor, herein called the controlling motor. This carriage carries pivoted angle levers 17, on which are contact blocks 18 which contact with contact strips, or rows of contacts, 19 19' 20 20' 21 21' 22 22' 23 23', arranged parallel to the screw shaft 15.

Under the carriage is a track 24 in which the carriage slides.

Ten contact strips or rows of contacts are shown and each block contacts with two strips or rows and connects them. The outer strips 19 19' 42 42' 23 23' and 45 45' with their contact blocks form a switch herein called the driving motor switch.

On the carriage 24' are two pulleys between which the weight-chain passes. A projection on the carriage extends between locking angle levers 25 26, pivoted at the angles and held by a spring 27 so as normally to engage with the projection on the carriage, and prevent its being moved when the controlling motor runs and operates the carriage 14. On lever 25, is a shoulder which projects over a shoulder on the other lever 26 so that if the first mentioned lever is drawn down the second lever must be drawn down also. But the second lever may be drawn down without drawing down the first lever with it, the reason for which is hereinafter explained.

On the carriage 24' is a switch plate 28, (see Fig. 3,) which connects terminals 29 30, forming with them a circuit breaker in one of the leads which is closed so long as the carriage occupies its central position in which it is shown in Fig. 1. The pivoted lever, 25, is connected with one end of a bell crank lever 31, the other end of which is connected with a centrifugal governor 32 driven from the shaft of the driving motor. Whenever the centrifugal governor is operated, upon the driving motor, and hence the hoisting screw shaft 2, attaining too great a speed, the bell crank lever is thrown, drawing down the two catches, 25 26, out of the way of the projection on the carriage 24'.

The foregoing is substantially the same apparatus as is described in my Patent No. 472,909 above mentioned. But as shown in this present application the angle lever 25 can be operated in another way. A link or chain connects its other end with the end of a pivoted and weighted armature 33 normally sustained by the magnet 34. This magnet is connected with the leads of the main circuit either in the position shown in Fig. 3 or in an independent shunt circuit between the leads as shown in Fig. 4. Upon failure of the current in the feed circuit this magnet loses its magnetism. The weighted armature 33 drops away from the electro-magnet 34, and pulls down the angle lever 25, and with it the other angle lever 26. Furthermore, as is also shown in my said patent, angle lever 26 is operated independently of angle lever 25 when the lever 35 is thrown by engagement of its vertical arm with a pin on the cross-head 36, when the hoisting sheaves reach the limit of movement which corresponds with the highest points of the car in the elevator shaft.

The operation of the apparatus so far described is as follows: When the switch 37 on the car is moved on to two of its pairs of contacts it closes a circuit, hereinafter described, through the controlling motor, in one direction or the other, according as the car is to ascend or descend. The screw shaft 15 attached to the armature shaft 16, revolves and carries the carriage 14 to the right or left; the chain 13 is drawn over pulley 38 or 39 and relieves the brake. This screw 15 and carriage 14 together with the armature shaft and chain 13 and pulleys 38 and 39, constitute the means provided for relieving the brake. At the same time a circuit is closed through the armature of the driving motor by connections hereinafter described. This motor turns and controls the movements of the car. The apparatus operates to reapply the brake in two distinct ways. First, the controlling motor may return the carriage 14 to its intermediate position, or, second, that one of the angle levers 25 26 which is holding the carriage against the pressure of the chain 13 may be withdrawn, by any one of the various means herein described. The combinations which effect the application of the brake in the second way above described are broadly "means for applying the brake independently of the position of the movable member." These combinations as herein shown differ among themselves only in the element which effects the withdrawal of the angle lever. When a claim includes an electro-magnet for normally restraining an element of the brake applying means the term "means for applying the brake" must include the armature of the electro-magnet, or some equivalent thereof. When a claim includes an electro magnetic device for applying the brake it is intended to describe a combination in which the electro-magnet and its armature, or equivalents, are elements. If the car attains such speed as to operate the speed governor the bell crank lever is thrown and the angle lever catches 25 26 which hold the carriage 24' in its central position, are drawn down below the lug on this carriage and this carriage runs to the right or left according to the position of the carriage 14, carrying with it the pulleys over which the chain 13 attached to the brake lever 11 is drawn. The brake is thus applied and stops the car and at the same time the feed circuit is broken at contacts 28 29 30. The same thing happens if the current in the leads 40 41 of the feed circuit fails while the car is ascending or descending since in this event the angle-lever 25 is thrown by the weighted armature 33 which is normally sustained by the electromagnet 34. If the current fails in the leads of the feed circuit while the car is ascending the brake is thrown on without the car reversing its direction and attaining speed sufficient to operate the speed governor, as would be necessary but for this electro-magnetic trip for the brake. When the car reaches the top landing the angle lever catch 26 is thrown down by means of the lever 35. The brake is thus applied and holds the car until the switch on the car is reversed and the carriage returns to the center position where it is stopped and held by the angle lever catch 25. Thus when the brake is applied by reason of the car reaching the top of the shaft, the brake can be relieved and the circuit established for lowering the car on mere reversal of the controlling switch, but the brake will remain on and. the circuit broken until the switch is reversed. As both of the angle lever catches 25 26, are operated by the speed governor and the electro-magnetic trip, the brake, when applied by the speed governor of the electro-magnetic trip, cannot be released by the mere reversal of the switch on the car until the speed of the car is checked or the current in the leads is re-established. And in the latter case it is also necessary for the armature to be moved into engagement with its electro-magnet, by the engineer in charge of the apparatus, before the brake can be released, since the armature is thrown clear out of the field of the electro-magnet. It will be observed that the feed circuit is always broken when the brake is applied by dropping angle lever 26 and releasing the carriage 24' on the right and cannot be re-established until the contacts are re-established between switch plate 28 and terminals 29 and 30. This prevents destruction of the safety plugs by the conductor throwing the current on the armature by operating his switch or by the current which has been broken being re-established in the leads while the motor armature is held stationary by the brake. This is also shown in my said patent.

The diagram will now be described. It differs in substance from the diagram illustrating the circuits in my said patent only in that the circuit of the field magnets of the driving motor is independent of the switches which control the connections of the armature; and in the introduction of the electromagnetic trip for the brake. In it such conductors as conduct the current to the driving motor are shown with parallel lines to indicate heavy wire while those which conduct the current only to the controlling motor are shown with single lines to indicate smaller wire. The upper end of the large switch shown secures connection of the driving motor with the feed circuit. The lower end secures connection of the motor with the brake circuit.

In the same plane with the contacts 19 to 23, are other contact strips 42 42' 43 43' 44 44' 45 45', of which 43, 43' 44 44' and 45 are connected respectively with strips 20 21' 21 20' and 23, by cross wires. The rows 19 and 42, are divided into several small segments which are connected through the resistance coils 47, either directly or by wires 48, or by branch wires 49. When the contact blocks 18, stand directly under any of the strips above described they form conducting bridges between said strips, but when the blocks stand under the connecting wires they are not in contact therewith. The driving motor is connected by a wire 50 to one of the segments of the lower row 19, the same segment being connected to one end of the resistance 47. The opposite terminal of the motor is connected by a wire 51 to the strip 23. The circuit through which the armature of the motor is supplied with current from the leads, herein called the feed circuit, (the contact blocks being on the upper row of contact strips) is as follows, (following the double lines:) lead 40, strip 42', contact block 18, one of the segments of the contact row or strip 42, one of the wires 49 and 48, resistance 47, wire 50, armature of the driving motor, wire 51, strips 23 and 45, contact block, strip 45', circuit breaker 29 28 30 and lead 41, through the source of supply to lead 40. The wires connected by the switch blocks in the position shown (the contact blocks being in contact with the lower row of strips) constitute a circuit for the driving motor independent of the feed circuit, of extremely small resistance through which flows the current that is generated by the motor when it is driven by the descending car. The circuit is herein called the brake circuit, because the motor armature when connected up with it, is driven as a dynamo by the car and consequently acts as a brake on the car. It will be seen that the resistances, which may be one or two sets as desired, are so connected as to be reversed with respect to the feed circuit and the brake circuit—i. e., they are so arranged that, when the driving motor switch is started along the row of contacts 42, the resistance will all be in the circuit and will be gradually cut out, and when the switch is started along row 19 none of the resistance will be in the circuit, but it will be gradually included in the circuit. The leads 40 41 of the feed or supply circuit are connected with any suitable electric generator. The first of these leads is connected to the contact strip 42', and the latter is connected to the strip 45'. From lead 40, a wire 51 is carried to the field coil of the controlling motor, and from the opposite terminal of the field coil of the controlling motor a wire 52 is carried to strip 43', and a second wire leads from the field magnet terminal to the contact 53 of the switch on the car, herein called the operator's switch. From lead 41 a wire is carried to strips 44' and 22'. From the armature of the controlling motor, wires lead to the contacts 54 and 55 of the operator's switch. This operator's switch is provided with three rows of contacts as shown and these contacts are adapted to be connected in pairs by the switch blocks 59 and 60. The contacts 53, 54, 55, and 56, of the first row are connected with the contacts having the same numbers in the second and third rows. Contacts 57 and 58 are connected with strips 43 and 44 as shown. The coils of the field magnet 61 of the driving motor are in a cross connection between the leads which is separate from the above described circuits and independent of any of the switches or circuit breakers above described. The field with the connections shown is separately excited in the sense that the current can be turned on and off from the armature without affecting the current in the field. And it may if desired be fed from different leads. But though thus independent of the switches the field is, as shown, in shunt with the armature when the car is ascending. If the field coils 61 were inserted between wires 50 51 in shunt with the armature, which would amount to substituting a shunt wound motor for the series wound motor shown in my said Patent No. 472,909, the field would then be controlled by the same switches in the same manner as the armature is controlled, and all advantage of the separately excited field would be lost.

The electro-magnet 34, which controls the magnetic trip is shown in the same cross connection with the field. This is not necessary as the magnet may be in a separate cross connection as shown in Fig. 4. But this magnet should also be independent of the switches. And advantage is gained by inserting it in the same cross connection with the field of the driving motor in the manner shown, since the brake will then be applied if the field circuit is broken. If by reason of failure of the current in the leads, the brake should be suddenly thrown onto the car as it is ascending at a rapid rate, the car might be tossed upward and returning produce a very bad jar. With the form of brake shown this is not apt to happen, but the connections described prevent any such sudden stopping of the car no matter what brake is used. For if the current in the leads fails the car will continue to ascend by its momentum and will run the motor and generate a current. This current will flow from the motor through wires 50 and 49 to strip 42, thence across block 18 to strip 42′, thence to lead 40, through electro-magnet 34, and through the field of the motor in the same direction in which the feed current has been flowing through the electro-magnet and field, to lead 41, (in circuit of Figs. 3 and 4,) thence to strip 45′ and 45, and thence through strip 23 back to the motor. This current will cause the electro-magnet 34, to hold on to its armature and prevent the application of the brake until the car has nearly stopped through loss of momentum. If the current fails while the car is descending the armature of the electro-magnet 34, drops immediately and applies the brake, unless restrained by the discharge of the field coils.

In order that, on failure of the current while the car is ascending, the brake should be applied by dropping the weighted armature 33, only after the car has substantially come to rest; it is not necessary that the motor should have a separately excited field in the sense in which the term is herein used, but it is necessary that the field coils of the motor and the coils of the electro-magnet 34 should be in a shunt or shunts around the armature. There will then be no reversal of their magnetism when the motor current replaces the current from the leads. The connections must be such when the car is ascending that the motor-armature and field, and the electro-magnet 34 are in a complete circuit. This circuit should be independent of the circuit through the source of energy, since the failure of the current may be and usually is due to a break in this latter circuit. It is always advantageous to have the electro-magnet 34 independent of the switch which controls the connections of the motor-armature so that the brake will never be accidentally applied through the necessary operation of the switch.

The operation is as follows: The frame 3 and other parts being in the position shown in Fig. 1, the car will be near the top of the shaft. When it is desired to descend the operator moves the switch blocks 59 60 onto the lower row of contacts so that 59, rests on 56 and 54 and 60 on 55 and 53. This will close the circuit of the controlling motor as follows: from lead 40, through the field to contact 53, across block 60, to contact 55, thence through the armature of the controlling motor to contact 54, across block 59 to contact 56, to strip 22, and across the block in contact therewith to strip 22′, and finally to lead 41. This drives the controlling motor in the proper direction to move the switch blocks 18 onto the lower rows of contact strips. As the carriage 14, carrying these contacts, moves, the chain is carried over the pulley at the left thus taking off the brake and allowing the car to descend. As block 18 passes along the row of contacts 19, the resistance in this circuit, which is at first very small, is gradually increased so as to diminish the current generated by the motor as the car descends, and hence diminish the braking effect of the motor on the car. Thus a gradual start is secured. When the block 18 reaches the end of strips 22 22′, the circuit of the controlling motor is broken and the switch blocks come to rest, and remain at rest until the conductor reverses the switch. In order to stop the elevator car gradually but certainly when it reaches the lower story, I provide an automatic circuit closer 62 operated by a moving part of the apparatus and closing the motor circuit through resistance 63, this resistance being also graduated and so connected that the resistance is at first that of the whole coil 63 and then a portion only of this resistance. In practice there should be a series of contacts over which a brush moving with the hoisting nut moves through a distance corresponding to a motion of the elevator car through several feet as shown in Figs. 1 and 3. Thus a gradual stop is secured. This resistance at its maximum is, as before stated, much less than the sum of the resistances 47. If the operator desires to stop the elevator during the descent, he will move the switch-blocks 59 60 to the middle row of contacts; this immediately reverses the controlling motor, since it sends the current through the armature in a reverse direction, while the current through the field magnet of the controlling motor remains the same, and thus brings the switch back to the intermediate position, and at the same time applies the brake, as will be evident. If, now, the operator desires to ascend, he will move the switch-blocks 59 60 onto the upper row of contacts. This closes the circuit of the controlling motor armature and turns said motor in a direction to move the switch-blocks toward the top (Fig. 3). When said blocks move toward the top, the first effect will be to open the brake circuit; the next effect will be to close the circuit through the driving motor and all the resistances 47, the circuit being as follows: from lead 40 to strip 42′ and across block 18 to one segment of strip 42, through resistance 47, across the armature of the driving motor to strips 23, and 45, thence to strip 45' and finally to lead 41. This causes the motor to turn slowly moving the frame 3, and cable sheaves carried thereby, to the left Fig. 1. As the controlling motor continues to turn, the switch-block, 18, moves along the upper row of contacts. As it passes over these the resistance in the feed circuit is gradually diminished thus allowing the motor to turn more rapidly. This secures a gradual pull and start of the car. The circuit of the controlling motor is again broken when the contact block reaches the end of strips 22 22'. The driving motor switch will then be stopped automatically. It can be reversed by throwing the switch blocks 59 60 of the operator's switch onto the middle row of contacts. The circuit will then include contact strips 44 44'. Should the speed governor operate and apply the brake during the motion of the car in either direction, the operator, by throwing the blocks of his switch on the middle line of contacts, can regain control over the car, after the car has been checked and the speed governor has returned to its normal position. For the closure of the switch at the middle line of contacts will reverse the controlling motor and bring the carriage 14, back to the neutral position, where it will be caught and held by the catches, 25 26, and thus restore the motor circuit at the contacts 28 29 30. When the brake is applied by the operation of the lever 35, on the car reaching the top landing of the shaft, the brake will be released upon mere reversal of the switch. When the brake is applied by the operation of the magnetic trip it cannot be released by any movement of the operator's switch but must be released by the one in charge of the driving machinery.

What I claim is—

1. In an electric elevator system the combination of an electric feed circuit, the armature of a driving motor therein, a brake, a movable member, as carriage 14, connected with the brake, means for moving said member to relieve the brake, means for applying the brake indepenently of the position of said member, and an electro-magnet which normally restrains the operation of an element of said brake-applying means, substantially as described.

2. In an electric elevator system the combination of an electric feed circuit, the armature of a driving motor therein, a switch for controlling the connections of the armature, a brake, a movable member, as carriage 14, connected with the brake, means for moving said member to relieve the brake, means for applying the brake independently of the position of said member, an electro-magnet in a normally closed shunt around the armature and switch, which normally restrain the operation of an element of said brake-applying means, substantially as described.

3. In an electric elevator system the combination of an electric feed circuit, the armature of a driving motor therein, a brake, means for relieving the brake, an electro-magnetic device independent thereof for applying the brake, the electro-magnet of said device being connected to the leads of the feed circuit in series with the field of the driving motor in a normally closed shunt around the armature, substantially as described.

4. In an electric elevator system the combination of an electric feed circuit, the armature of a driving motor therein, a brake, a circuit-breaker in the feed circuit, means for relieving the brake, an electro-magnetic device independent thereof for applying the brake and opening the circuit breaker, substantially as described.

5. In an electric elevator system the combination of an electric feed circuit, the armature of a driving motor therein, a brake, a circuit breaker in the feed circuit, means for relieving the brake, an electro-magnetic device for apply the brake and opening the circuit breaker, the electro-magnet of said device being in a shunt around the armature, substantially as described.

6. In an electric elevator system the combination of an electric feed circuit, the armature of a driving motor therein, a brake, a circuit-breaker in the feed circuit, means for relieving the brake, an electro-magnetic device independent thereof for applying the brake and opening the circuit breaker, the electro-magnet of said device being connected to the leads of the feed circuit in series with the motor field in a shunt around the armature, substantially as described.

7. In an electric elevator system the combination of an electric feed circuit, the armature of a driving motor therein, a switch in the feed circuit, a brake, means for relieving the brake, an electro-magnet independent thereof and of the switch in a shunt around the armature and switch, and means whereby the said electro-magnet applies the brake when the current fails, substantially as described.

8. In an electric elevator system the combination of a car, an electric feed circuit, a shunt wound driving motor, a switch for connecting the motor armature with the feed circuit when the car is ascending, a brake, means for applying the brake, an electro-magnet which normally restrains the operation of an element of said brake-applying means, said electro-magnet being in a shunt around the motor-armature, the electro-magnet and the field and armature of the motor all being electrically connected in closed circuit when the motor armature is connected with the feed circuit, substantially as described.

9. In an electric elevator system the combination of a car, an electric feed circuit, a driving motor, a switch for connecting the motor-armature with the feed circuit when the car is ascending, a brake, means for applying the brake, an electro-magnet which normally restrains the operation of an element of said brake-applying means, said electro-magnet being connected with the feed circuit in a shunt around the motor-armature and switch, the switch, and electro-magnet, and the field and armature of the motor all being electrically connected in closed circuit when the motor armature is connected with the feed circuit, substantially as described.

10. In an electric elevator system the combination of an electric feed circuit, the armature of a driving motor therein, a circuit breaker in the feed circuit, a switch in the feed circuit, a brake, means for relieving the brake, an electro-magnet independent thereof and of the switch in a shunt around the armature and switch, means whereby the said electromagnet applies the brake and opens the circuit breaker when the current fails, substantially as described.

11. In an electric elevator system the combination of an electric feed circuit, a driving motor, hoisting mechanism controlled thereby, a brake, a movable member, as carriage 14, connected therewith for relieving the brake, means for operating the movable member to relieve the brake, means for applying the brake independently of the position of the movable member, and an electro magnet in the feed circuit which normally restrains the operation of an element of said brake applying means, substantially as described.

12. In an electric elevator system the combination of an electric feed circuit, a driving motor, hoisting mechanism controlled thereby, a brake, a movable member, as carriage 14, connected therewith for relieving the brake, means for operating the movable member to relieve the brake, means for applying the brake independently of the position of the movable member, and an electro-magnet in the feed circuit in a shunt around the armature of the driving motor, which normally restrains the operation of an element of said brake applying means, substantially as described.

13. In an electric elevator system the combination of an electric feed circuit, a driving motor, hoisting mechanism controlled thereby, a brake, a movable member, as carriage 14, connected to the brake by a chain, a pulley over which the chain is thrown between the brake and movable member, means for operating the movable member to relieve the brake when the pulley is in place, a catch for holding the pulley in place, an electro-magnet, a weight connected to the catch and normally sustained by the electro-magnet, but releasing the pulley and applying the brake when the current fails, substantially as described.

14. In an electric elevator system the combination of an electric feed circuit, a driving motor, hoisting mechanism controlled thereby, a switch in circuit with the armature of the driving motor, a brake, a movable member of the switch, as carriage 14, for relieving the brake, means for operating the movable member to relieve the brake, means for applying the brake independently of the position of the movable member, and an electro-magnet connected with the feed circuit in shunt around the switch and the armature of the driving motor, which normally restrains the operation of an element of said brake applying means, substantially as described.

15. In an electric elevator system the combination of an electric feed circuit, a motor, hoisting mechanism controlled thereby, a brake, a circuit breaker, means for applying a brake and opening the circuit breaker, and an electro-magnet which normally restrains the operation of an element of said brake applying means, substantially as described.

16. In an electric elevator system the combination of an electric feed circuit, a driving motor, hoisting mechanism controlled thereby, a brake, a movable member, as carriage 14, for relieving the brake, means for operating the movable member to relieve the brake, a circuit breaker in the feed circuit, means for applying the brake and opening the circuit breaker independently of the position of the movable member, and an electro magnet connected with the feed circuit, which normally restrains the operation of an element of said brake applying means, substantially as described.

17. In an electric elevator system the combination of an electric feed circuit, a driving motor, hoisting mechanism controlled thereby, a brake, a movable member, as carriage 14, for relieving the brake, means for operating the movable member to relieve the brake, a circuit breaker in the feed circuit, means for applying the brake and opening the circuit breaker independently of the position of the movable member, and an electro magnet connected with the feed circuit in a shunt around the armature of the driving motor, which normally restrains the operation of an element of said brake applying means, substantially as described.

18. In an electric elevator system the combination of an electric feed circuit, a driving motor, hoisting mechanism controlled thereby, a brake, a movable member, as carriage 14, connected to the brake by a chain, a pulley over which the chain is thrown between the brake and the movable member for operating the movable member to relieve the brake when the pulley is in place, a circuit breaker in the feed circuit controlled by the pulley and closed when the pulley is in place, a catch for holding the pulley in place, and an electro-magnet connected with the circuit, means normally restrained by the electro-magnet for releasing the pulley from the catch, to apply the brake and open the circuit breaker when the current fails, substantially as described.

19. In an electric elevator system the combination of an electric feed circuit, a driving motor, hoisting mechanism controlled thereby, a switch in the circuit with the armature of the driving motor, a brake, a movable member, as carriage 14, for relieving the brake, means for operating the movable member to relieve the brake, a circuit breaker in the feed circuit, means for applying the brake and opening the circuit breaker independently of the position of the movable member, and an electro-magnet connected with the leads of the feed circuit in a shunt around a switch and the armature of a driving motor, which normally restrains the operation of an element of said brake applying means, substantially as described.

20. In an electric elevator system, the combination of an electric feed circuit, a driving motor therein, hoisting mechanism controlled thereby, a switch in the circuit with the armature of the driving motor, a brake, a movable member of the switch, as carriage 14, for relieving the brake, means for operating the movable member to relieve the brake, a circuit breaker in the feed circuit, means for applying the brake and opening the circuit breaker independently of the position of the movable member, and an electro-magnet connected with the leads of the feed circuit in a shunt around the switch and the armature of the driving motor, which normally restrains the operation of an element of the brake applying means, substantially as described.

21. In an electric elevator system the combination of a feed circuit, a motor therein, hoisting mechanism controlled thereby, a switch for controlling the connection of the motor armature with the feed circuit, a brake applied by power independent of the current, a movable member of the switch, as carriage 14, connected with the brake by a chain, a pulley over which the chain is thrown between the brake and the movable member, means for operating the movable member to relieve the brake when the pulley is in place, a catch for holding the pulley in place, an electro-magnet connected to the feed circuit independently of the switch, a weight connected to the catch and normally sustained by the electro-magnet, but releasing the pulley and applying the brake when the current fails, substantially as described.

22. In an electric elevator system the combination of an electric motor having a separately excited field, a car, hoisting mechanism connecting the car and motor, and driving the motor as the car descends, a brake circuit, a switch for connecting the motor-armature with the brake circuit to control the speed of the car in descent, a second motor for operating the switch, and a second switch operated by the operator of the car for controlling the second motor, substantially as described.

23. In an electric elevator system the combination of an electric motor having a separately excited field, a car, hoisting mechanism connecting the car and the motor, and driving the motor, as the car descends, a feed circuit, a brake circuit, a switch for connecting the motor armature with the brake circuit without disturbing the connection of the field with the field circuit to control the speed of the car in descent; a second motor for operating the switch and a second switch operated by the operator of the car for controlling the second motor, substantially as described.

24. In an electric elevator system the combination of an electric motor having a separately excited field, a car, hoisting mechanism connecting the car and the motor and driving the motor as the car descends, a feed circuit, a series of graduated resistances therein, a brake circuit, a series of graduated resistances therein, the resistances being reversed with respect to the two circuits, and means for connecting the motor-armature with the feed circuit, and gradually decreasing the resistance therein and for connecting the motor-armature with the brake circuit, without disturbing the connection of the field with the field circuit and gradually increasing the resistance therein as the elevator is to ascend or descend, substantially as described.

25. In an electric elevator system the combination of an electric motor having a separately excited field, a car, hoisting mechanism connecting the car and the motor and driving the motor as the car descends, a feed circuit, a series of graduated resistances therein, a brake circuit, a series of graduated resistances therein, the resistances being reversed with respect to the two circuits, and a switch-member which can be connected with these series of resistances, for connecting the motor-armature with the feed circuit, or with the brake circuit, without disturbing the connection of the field with the feed circuit, as the elevator is to ascend or descend, substantially as described.

26. In an electric elevator system the combination of an electric motor having a separately excited field, a car, hoisting mechanism connecting the car and the motor and driving the motor as the car descends, a feed circuit, a brake circuit, a switch for connecting the motor armature with the feed circuit or brake circuit as the car is to ascend or descend, a second motor for operating the switch, and a second switch operated by the operator of the car, for controlling the second motor, substantially as described.

Subscribed by me, in New York city, this 3d day of February, 1892.

CHARLES R. PRATT.

In presence of—
  P. O'SHAUGHNESSY,
  I. T. BELL.